Nov. 10, 1959  J. P. LEPPICH  2,911,752
FISH HOOK ASSEMBLY
Filed May 7, 1954  2 Sheets-Sheet 1
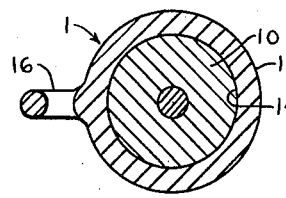
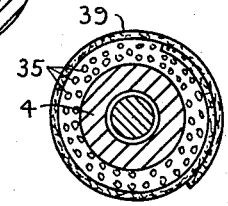
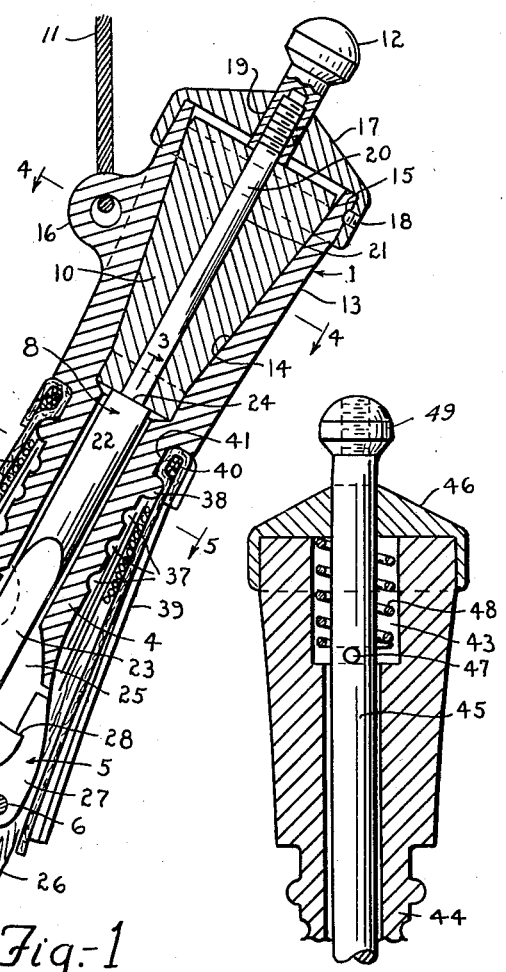
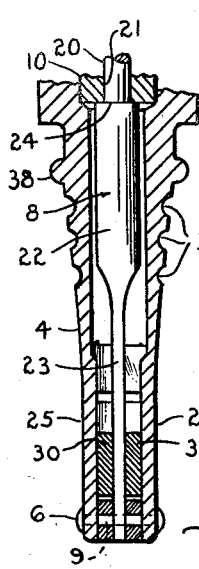
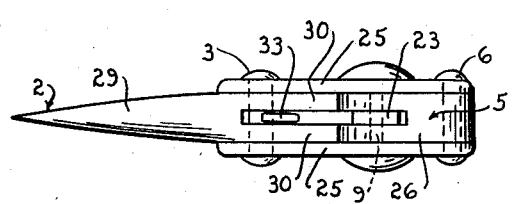
INVENTOR.
JOSEPH P. LEPPICH
BY
Charles S. Penfold
ATTORNEY

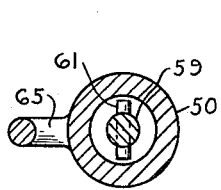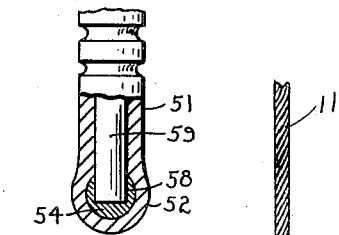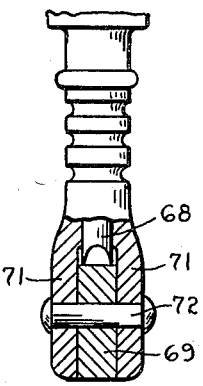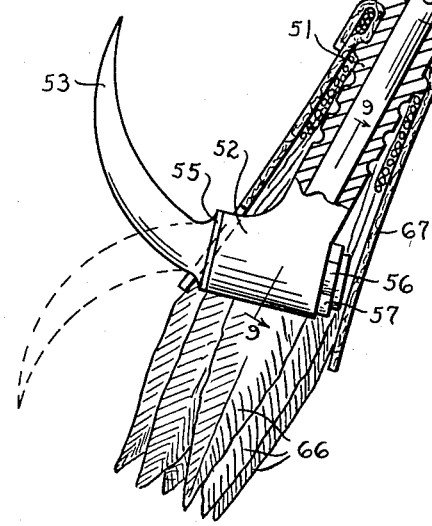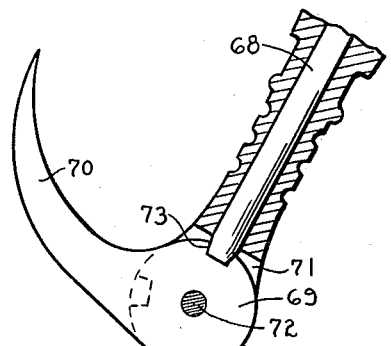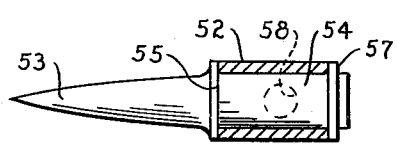

United States Patent Office 2,911,752
Patented Nov. 10, 1959

2,911,752

FISH HOOK ASSEMBLY

Joseph Paul Leppich, Bronson, Mich.

Application May 7, 1954, Serial No. 428,151

12 Claims. (Cl. 43—42.28)

The invention relates generally to fishing tackle and more particularly is directed to improvements in fish hooks for catching large game fish such as tuna.

The mouth structure of large fish is comprised of tough cartilage and muscle and when the barb of a conventional hook becomes imbedded therein it is exceedingly difficult to remove it. This is particularly a real problem with commercial fishermen, because any delays encountered with respect to releasing hooks limits the number of fish caught. Also, removing some imbedded hooks ofttimes requires considerable effort and strength and occasionally a person is seriously injured during this task. Furthermore, the job in other instances is a messy one.

An important object of the invention is to provide a hook assembly with a pivotal barb, means for holding it in an operative position, and means for automatically releasing the barb when the hook is tilted to a predetermined angle. More particularly, the hook assembly, among other things, comprises a tubular body, a barb pivotally connected thereto, locking means preferably in the form of a latch movably mounted barb. The arrangement is such that the weight will automatically actuate the shaft to control the operation of the latch so that it will release the barb when the hook is tilted to a predetermined angle. Provision is made whereby the shaft can also be manually actuated to release the barb when so desired.

Another object of the invention is to provide a hook assembly with resilient means, such as a spring, which may be utilized in lieu of the weight above referred to, in which event the shaft has to be manually actuated to effect a release of the barb through movement of the latch.

A further object of the invention is to provide a strong hook assembly in which the tubular body thereof includes an upper extremity provided with a chamber within which the weight or spring is located and a lower extremity which carries the barb, latch and the resilient means acting on the barb.

Also, an object is to provide a modified form of hook assembly having a rotatable barb and a longitudinally movable shaft for direct engagement with the barb for manually locking the barb in an operative position and then releasing it from this position when desired.

Many other objects and advantages of the invention will become apparent after the description hereinafter set forth is considered in conjunction with the drawings annexed hereto which depict several modifications of the invention.

In the drawings:

Figures 1 through 5 exemplify one embodiment or modification of the invention;

Figure 1 is a central longitudinal section taken through the hook assembly illustrating details of design and construction;

Figure 2 is a bottom end view of the assembly;

Figures 3, 4 and 5 are sectional views respectively taken substantially on lines 3—3, 4—4, and 5—5 of Figures 1, with the feathers and shroud removed in Figures 3 and 4;

Figure 6 is a partial longitudinal section of the upper extremity of a second modification of the invention;

Figures 7 through 10 exemplify a third modification;

Figure 7 is a central longitudinal partial section showing a shaft in direct engagement with a barb;

Figures 8 and 9 are sectional views respectively taken substantially on lines 8—8 and 9—9 of Figure 7, the compression spring being omitted in Fig. 8;

Figure 10 is a partial section showing the mode of supporting the barb on the lower extremity of the hook body; and Figures 11 and 12 are partial sectional views of a fourth modification of the invention.

Referring first to the novel hook assembly illustrated in Figures 1 through 5 of the drawing, numeral 1 generally designates an elongated tubular metal body, 2 a barb or hook pivoted at 3 to the lower extremity 4 of the body, locking means 5 preferably in the form of a latch pivoted at 6 to the body, a spring 7 for normally urging the barb in a predetermined direction and so that it will be engageable by the latch, a shaft 8 connected to the latch at 9, a weight 10 carried by the shaft for gravitationally maintaining the shaft in a lower position to cause the latch to lock the barb in an operative position when the hook is suspended by a line 11 or is drawn through the water, and a handle 12 connected to the shaft for manually actuating it to unlatch the latch, when desired, and thereby allow the barb to swing to the dotted line inoperative position as shown in Figure 1 against the action of the spring 7 when the hook assembly is being pulled from the mouth of a fish.

The body of the hook assembly may be constructed from any suitable material, such as brass, and includes the lower extremity 4 and also an upper extremity 13 which is preferably tapered and somewhat larger in cross-section than the lower extremity which is substantially cylindrical. The upper extremity is provided with a tapered chamber 14 within which the weight 10 is longitudinally movable. The upper extremity is also provided with a recess 15 and an eye 16 for the line.

A cap 17 is detachably secured over the open end of the chamber by a set screw 18 which engages the recess 15. The cap is provided with a hole 19 through which the handle 12 projects. The handle is internally threaded and connects with the upper threaded end of the shaft 8. Obviously, the cap can be secured to the body in various ways, such as by screw threads or snap-connection means.

The shaft 8 is preferably of a one-piece construction and includes a cylindrical portion 20 extending through a hole 21 in the weight, a cylindrical portion 22 of a larger diameter and a shorter length than the portion 20 and a flattened portion 23. Due to the difference in the diameters of the cylindrical portions a shoulder 24 is formed against which the weight bears when the handle 12 is tightened against the weight to firmly secure the weight on the shaft for movement therewith.

The lower end of the extremity 4 is preferably formed to provide an enlargement having an opening or recess therein to form a pair of corresponding substantially parallel walls 25 between which a portion of the barb 2 and latch 5 are located. The latch may be arranged and constructed in various ways but as herein shown is located within the confines of the heel portion of the enlargement and is provided with a pair of legs 26 and 27 disposed substantially at right angles with respect to one another. The end of the generally horizontal leg 26 is provided with a slot which receives the lower flattened end 23 of the shaft 8 and the inner edge of the generally vertical leg 27 is interrupted by a notch forming an abutment or shoulder 28.

The barb is mounted on the pivot 3 in the toe portion of the enlargement. The barb includes an outer exposed horn-like pointed extremity 29 and an inner extremity disposed within the enlargement. The inner extremity is bifurcated to form a pair of corresponding parallel walls or curved fingers 30 which straddle the lower flattened portion 23 of the shaft and are forced by the spring 7 in a direction toward the lower leg 26 of the latch as shown in Figure 1. Upward movement of the shaft will cause the latch to release the barb so as to permit the barb to move to the dotted line position in Figure 1 when the hook is being pulled from the mouth of a fish. When the barb moves to the dotted line position the pressure of the spring is increased and when the hook is removed from the fish the barb will snap back into engagement with the lower leg of the latch. The lower extremity 4 is provided with an inclined abutment 31 which is engaged by the fingers 30 of the barb to limit pivotal movement of the barb to said dotted line position.

The spring 7 includes a coil surrounding the pivot 3, a hooked end 32 caught about a pin 33 bridging the walls of the barb and an end 34 bearing against the abutment 31 on the lower extremity of the body for normally urging the barb in a clockwise direction as viewed in Figure 1. It will be noted that the barb, shaft, weight and latch are movable in the same plane and that the eye 16 connected to the line is located on the same side of the body as the barb and so that the hook will take an inclined position when suspended as illustrated in Figure 1.

In order to assist in attracting fish and concealing the lower extremity of the hook, feathers 35 are preferably secured in surrounding and depending relationship to such extremity. The upper portions of the feathers may be detachably secured in place by any suitable means, such as strong thread 36, which are intended to force portions of the feathers into exterior grooves 37 and/or against the lower extremity 4 below a bead 38 to prevent downward slippage of the feathers. It is to be understood that attraction means other than feathers may be utilized. For example, buck hair, plastic or rubber appendages and the like could be used.

A shroud or skirt 39 constructed out of any suitable flexible material, such as sheepskin, is also preferably detachably secured to the body at the waist thereof, in surrounding relationship to the feathers. More specifically, the securing means preferably in the form of thread 40 is so arranged and drawn tight to cause the material of the skirt to fit in a groove 41 above the bead 38 with upper portions of the skirt overlapping the bead as shown in Figure 1 and with longitudinal portions of the skirt overlapping each other as shown in Figure 5. The barb or hook 2 extends through the feathers and a clearance slot 42 is provided therefor in the shroud.

In view of the foregoing it will be manifest that when the hook is suspended or pulled through the water, the weight 10 aided by the spring will cause the shaft to hold the latch interlocked with the barb to retain it in an operative position. The components of the hook assembly are so constructed and arranged that when a fish is caught and landed in a boat the hook assembly will usually fall to an inclined position with the weighted extremity of the assembly below the lower extremity. This drop or fall, in part, is due to the location of the weight, and the moment the hook assembly falls or turns over to a predetermined inclined position, the weight will move the shaft downwardly and pivot the latch until the fingers 30 on the barb disengage the abutment 28 on the latch to release the barb so that it can be moved to the dotted line position in Figure 1 against the force of the spring 7 by the activity of a caught fish or by a pull on the line 11 against the weight of a hooked fish.

In most instances the hook can be removed by merely giving a moderate pull on the line acting against the weight of a hooked fish. Occasionally a landed fish will flop to a position where the barb will not be tiltable. When this occurs, it is merely necessary to grasp the handle 12 and pull upwardly as viewed in Figure 1 to release the latch from the barb or hook. When the hook assembly is righted the weight will automatically effect a relocking of the barb in the operative position, the barb being normally urged in a clockwise direction, as viewed in Figure 1, through the agency of the spring 7. Touching or handling the fish is seldom required.

The second form of hook assembly illustrated in Figure 6 of the drawing includes a tubular body having a chambered upper extremity 43 and a lower extremity 44, the latter of which is similar to the lower extremity 4 above referred to. A manually operable shaft 45 extends into the body through a cap 46 and is operatively connected with a latch (not shown) corresponding to the latch 5. The shaft is provided with abutment means preferably in the form of a pin 47, located in the chamber of the upper extremity of the hook body and a helical compression spring 48 is also located in this chamber. This spring surrounds the shaft and one end of the spring engages the pin and its other end the cap for manually forcing the shaft downwardly to maintain the latch interlocked with the barb or hook not shown. To release the barb from the latch it is merely necessary to grasp a handle 49 threaded on the shaft and pull outwardly thereon.

The third modification of the invention exemplified in Figures 7 through 10, except for the differences in the character of the barb and shaft, is similar to the second modification. More particularly, the third form of hook assembly includes a tubular body having a chambered upper extremity 50 and a lower extremity 51 of a cross-sectional dimension slightly less than that of the upper extremity. The lower extremity is provided with an integral generally cylindrical tubular formation 52, the longitudinal axis of which is disposed at an obtuse angle with respect to the longitudinal axis of the tubular body of the hook. The barb or hook includes an exposed curved horn-like pointed extremity 53 and a cylindrical extremity 54 which is journalled in the formation 52. The barb is provided with an annular flange 55 which bears against one end of the formation. The cylindrical extremity of the barb is provided with a reduced or neck portion 56 and a yieldable flat locking element 57 detachably engages the neck portion to lock the barb in place. The cylindrical portion of the barb is further provided with an abutment, a barb positioning or locating means preferably in the form of a round recess as 58.

The assembly also includes a shaft 59 extending downwardly through a cap 60 into the body with its lower end seated in the recess 58 as shown in Figure 9 to lock the barb in a predetermined operative position as shown in Figure 7. The shaft is provided with abutment means 61 preferably in the form of a pin and a helical compression spring 62 surrounds the shaft with one end engaging the pin and the other end the cap to urge the shaft downwardly to hold the shaft interlocked with the barb. To release the shaft from the barb or hook it is merely necessary to grasp a handle 63 on the shaft and pull upwardly. To reset the barb to the operative position shown in Figure 7 the barb is rotated until the recess reaches a position to permit the shaft to snap into the recess 58.

The cap 60 is provided with a grooved portion located in the upper extremity of the body and a set screw 64 is engageable with the groove for detachably securing the cap in place. The body of the hook is provided with an eye 65, attraction means 66 and a shroud 67 which substantially correspond to those above referred to.

The hook assembly constituting the fourth modification of the invention illustrated in Figures 11 and 12 of the drawing includes a tubular body provided with a spring pressed shaft 68 and a barb or hook having a disc portion 69 and a pointed extremity 70. The lower extremity of the body is provided with an opening in the form of a slot or notch to form a pair of substantially parallel walls 71 of a shape more or less corresponding to the shape of the disc portion 69. A pin 72 extends through apertures provided therefor in the walls 71 and pivotally supports the hook. The disc portion is provided with locating or abutment means in the form of a notch 73 and the lower end of the shaft is tapered to facilitate its entry into the notch. It will be noted that the barb pivots in the plane of the body as the hook in the first modification but that the axis of the shaft intersects the notch and the axis of the pivot pin. This arrangement provides a positive and efficient interlock between the shaft and hook. When the shaft is pulled outwardly the shaft will disengage the hook and permit the latter to pivot to the dotted line position shown in Figure 11. To reset the hook to the operative position shown in Figure 11 the barb is merely rotated to locate the notch 73 so that the shaft will snap into the notch.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described.

I claim:

1. A fish hook assembly comprising a tubular body having an upper extremity and a lower extremity, line attaching means provided on the upper extremity, a member secured to the upper extremity and provided with a hole, a barb pivotally connected to the lower extremity, barb positioning means, a longitudinal shaft reciprocably mounted in the body and having an extremity extending through the hole in the member for manually reciprocating the shaft and having a lower extremity for cooperating with the barb positioning means to hold the barb in an operative position, and means independent of the line attaching means disposed in the upper extremity of the body for normally urging the shaft in said cooperative relationship with the barb positioning means to maintain the barb in an operative position until it is released by partial reciprocation of the shaft.

2. The structure defined in claim 1, in which the barb positioning means includes a latch pivotally mounted on the lower extremity of the body for cooperation with the shaft and the barb.

3. The structure defined in claim 1, in which the barb positioning means includes a latch which is pivotally mounted on the lower extremity of the body and pivotally connected to the lower extremity of the shaft for cooperation with the barb, and the independent means comprises a weight connected to the shaft.

4. The structure defined in claim 1, in which the barb positioning means includes a latch which is pivotally mounted on the lower extremity of the body and connected to the lower extremity of the shaft for cooperation with the barb, and a spring is provided for urging the barb into cooperation with the latch.

5. The structure defined in claim 1, in which the independent means comprises a weight connected to the shaft.

6. The structure defined in claim 1, in which the barb positioning means comprises a cylindrical portion on the barb and abutment means formed thereon for engagement with the lower extremity of the shaft.

7. The structure defined in claim 1, in which the barb positioning means includes a cylindrical portion pivotally connected to the lower extremity of the body, abutment means provided on the cylindrical portion, and abutment means provided on the lower extremity of the shaft for cooperation with the abutment means on said cylindrical portion.

8. The structure defined in claim 1, in which the upper extremity of the body is provided with a chamber within which the independent means is located, the member is in the form of a cap detachably connected to the upper extremity of the body, and the barb is connected to the lower extremity of the body for movement about an axis disposed transversely to the longitudinal axis of the body.

9. The structure defined in claim 1, including resilient means for normally urging the barb in a predetermined pivotal direction.

10. The structure defined in claim 1, in which the line attaching means when attached to a line supports the assembly in a depending position, the extremity of the shaft extending into the hole in the member is provided with a removable handle, the independent means comprises a weight secured to the shaft by the handle, and the weight serves to effect partial reciprocation of the shaft when the hook assembly is tilted to a substantially horizontal position.

11. The structure defined in claim 1, in which the assembly is supported in a depending position when the attaching means is connected to a line, the independent means is a weight connected to the shaft to maintain the barb in an operative position when the assembly is in said depending position and serve to automatically actuate the shaft to release the barb when the assembly is tilted sufficiently to permit the weight to move the shaft relative to the body.

12. The structure defined in claim 1, in which the independent means comprises resilient means operatively connected to the shaft.

References Cited in the file of this patent

UNITED STATES PATENTS

| | | |
|---|---|---|
| D. 110,648 | Powell | July 26, 1938 |
| 690,945 | Gray | Jan. 14, 1902 |
| 740,775 | Pardon | Oct. 6, 1903 |
| 1,344,693 | Hinsdale | June 29, 1920 |
| 1,597,472 | Keeler | Aug. 24, 1926 |
| 1,654,830 | Pflueger | Jan. 3, 1928 |
| 1,734,883 | Shannon | Nov. 5, 1929 |
| 1,803,561 | Rodin | May 5, 1931 |
| 2,118,147 | Blodgett et al. | May 24, 1938 |
| 2,501,210 | Cretin | Mar. 21, 1950 |
| 2,611,983 | Silva | Sept. 30, 1952 |
| 2,611,986 | Silva | Sept. 30, 1952 |

FOREIGN PATENTS

| | | |
|---|---|---|
| 210,190 | Great Britain | Jan. 31, 1924 |